US010969297B2

(12) United States Patent
Su et al.

(10) Patent No.: US 10,969,297 B2
(45) Date of Patent: Apr. 6, 2021

(54) DYNAMIC DIAGNOSIS SYSTEM AND METHOD FOR CONCRETE DAMAGE BASED ON DISTRIBUTED SENSING OPTICAL FIBER

(71) Applicant: HOHAI UNIVERSITY, Jiangsu (CN)

(72) Inventors: Huaizhi Su, Jiangsu (CN); Meng Yang, Jiangsu (CN); Hong Luo, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 205 days.

(21) Appl. No.: 16/099,192

(22) PCT Filed: Apr. 26, 2017

(86) PCT No.: PCT/CN2017/082070
§ 371 (c)(1),
(2) Date: Nov. 6, 2018

(87) PCT Pub. No.: WO2017/190618
PCT Pub. Date: Nov. 9, 2017

(65) Prior Publication Data
US 2019/0212224 A1 Jul. 11, 2019

(30) Foreign Application Priority Data

May 6, 2016 (CN) .......................... 201610298626.4

(51) Int. Cl.
*G01M 5/00* (2006.01)
*G01H 9/00* (2006.01)

(52) U.S. Cl.
CPC .......... *G01M 5/0066* (2013.01); *G01H 9/004* (2013.01); *G01M 5/00* (2013.01); *G01M 5/0091* (2013.01)

(58) Field of Classification Search
CPC .... G01M 5/00; G01M 5/0066; G01M 5/0091; G01M 11/083; G01H 9/004; G01L 1/242
See application file for complete search history.

(56) References Cited

U.S. PATENT DOCUMENTS 4,656,421 A * 4/1987 Ellis ................... G01R 33/0327
250/227.19
4,717,253 A * 1/1988 Pratt, Jr. ................ G01B 11/16
356/32
(Continued)

FOREIGN PATENT DOCUMENTS

| CN | 101526339 | 9/2009 |
| CN | 101963493 | 2/2011 |

(Continued)

OTHER PUBLICATIONS

"International Search Report (Form PCT/ISA/210)", dated Jul. 27, 2017, with English translation thereof, pp. 1-6.

*Primary Examiner* — Natalie Huls
(74) *Attorney, Agent, or Firm* — JCIPRNET

(57) ABSTRACT

The present invention discloses a dynamic diagnosis system and method for concrete damage based on a distributed sensing optical fiber. The system includes an upper fixed platform and lower fixed platforms, the upper fixed platform is provided with an optical fiber correction entity and an optical fiber framing platform, the optical fiber correction entity is provided with a butterfly-shaped optical fiber pressing block, the optical fiber framing platform is provided with an optical fiber threaded column, a sensing monitoring barrel and a disturbance eliminating barrel are arranged below the upper fixed platform, the downside of the sensing monitoring barrel is connected with a left fiber fixing beam, the left fiber fixing beam is connected with a left barrel bottom cone, the left barrel bottom cone is hinged with a left port light source protection body, the lower end of the disturbance eliminating barrel is connected with a right fiber fixing beam, the right fiber fixing beam is connected with a right barrel bottom cone, and the right barrel bottom cone is hinged with a right port light source protection body. The dynamic diagnosis system and method are not only capable (Continued)

of catching microvibration, but also capable of bearing greater-amplitude vibration, so that the vibration monitoring range is greatly widened, and the demand for dynamic diagnosis of concrete structural damage is met perfectly.

6 Claims, 3 Drawing Sheets

(56) References Cited

U.S. PATENT DOCUMENTS

| | | | | |
|---|---|---|---|---|
| 5,132,529 | A * | 7/1992 | Weiss | G01B 11/18 |
| | | | | 250/227.16 |
| 5,259,045 | A * | 11/1993 | Azuma | G02B 6/2852 |
| | | | | 250/227.16 |
| 5,381,005 | A * | 1/1995 | Chazelas | G01L 1/242 |
| | | | | 250/227.19 |
| 5,381,492 | A * | 1/1995 | Dooley | G01H 9/004 |
| | | | | 250/227.11 |
| 5,563,348 | A * | 10/1996 | Suzuki | G01L 1/103 |
| | | | | 73/581 |
| 5,900,556 | A | 5/1999 | Ahmad et al. | |
| 7,262,834 | B2 * | 8/2007 | Kageyama | G01H 9/004 |
| | | | | 356/28 |
| 2007/0069115 | A1 | 3/2007 | Huang et al. | |

FOREIGN PATENT DOCUMENTS

| | | |
|---|---|---|
| CN | 102425994 | 4/2012 |
| CN | 105910992 | 8/2016 |
| CN | 205719930 | 11/2016 |
| JP | 2011022029 | 2/2011 |

* cited by examiner

DYNAMIC DIAGNOSIS SYSTEM AND METHOD FOR CONCRETE DAMAGE BASED ON DISTRIBUTED SENSING OPTICAL FIBER

CROSS-REFERENCE TO RELATED APPLICATION

This application is a 371 application of the international PCT application serial no. PCT/CN2017/082070, filed on Apr. 26, 2017, which claims the priority benefit of China application no. 201610298626.4, filed on May 6, 2016. The entirety of each of the above-mentioned patent applications is hereby incorporated by reference herein and made a part of this specification.

BACKGROUND

Technical Field

The present invention relates to a dynamic diagnosis system and method for concrete damage based on a distributed sensing optical fiber and belongs to the fields of dynamic diagnosis and detection in water conservancy projects.

Related Art

At present, a large number of large-scale and super-huge water conservancy projects such as Three Gorges Project, Ertan which is 240 m high, Wujiang Goupitan which is 231 m high, Xiaowan which is 294.5 m high, Xiluodu which is 278 m high, Baihetan which is 289 m high and Jinping-I Project which is 305 m high have been constructed in China, the safety of a hydraulic concrete structure is directly related to the development of social and economic benefits and the life and property safety of people, compared with other types of project structures, the hydraulic concrete structure has an outstanding characteristic that the interaction between a building and a water body is generally required to be considered, most of large-scale water conservancy projects are constructed in deep mountains and valleys where are relatively high in unit discharge during flood discharge, very high in flood discharge power and capable of stimulating the vibration of the building, acquiring the vibration of the building through monitoring, analyzing to recognize feature parameters reflecting overall and local features of structures such as mode parameters of the building, and therefore, the establishment of a dynamic diagnosis system and method for a damage condition of a hydraulic concrete structure such as a dam is of great theoretical and practical significance.

In order to realize the dynamic diagnosis of a concrete structure, a monitoring system is required to have the characteristics such as real-time online monitoring, lossless monitoring and multi-scale monitoring, a conventional dynamic diagnosis system for structural damage is difficult to adapt to a hydraulic concrete structure such as a dam with a relatively large volume, it will be more difficult to perform damage diagnosis on the hydraulic concrete structure such as the dam under the condition that the hydraulic concrete structure suffers from external adverse conditions such as earthquake and water flow pulsation, related theoretical researches are also obviously insufficient, a vibration-based structural damage diagnosis method has been widely applied in many fields, however, the application of the vibration-based structural damage diagnosis method in hydraulic conservancy and civil projects is still at a starting stage of mode parameter identification and damage diagnosis, and therefore, it is urgent to develop a dynamic diagnosis system and a complete technology capable of efficiently identifying concrete structural damage.

SUMMARY OF THE INVENTION

Purpose of the invention: in order to overcome defects in the existing technology, the present invention provides a dynamic diagnosis system and method for concrete damage based on a distributed sensing optical fiber, the dynamic diagnosis system and method are not only capable of catching microvibration, but also capable of bearing greater-amplitude vibration, so that the vibration monitoring range is greatly widened, the demand for dynamic diagnosis of concrete structural damage is met perfectly, and the important support is provided for the current dynamic health monitoring and detection of a hydraulic concrete structure.

Technical solution: in order to achieve the aim, the dynamic diagnosis system for concrete damage based on the distributed sensing optical fiber, provided by the present invention, comprises an upper fixed platform and lower fixed platforms, the upper fixed platform is internally provided with an optical fiber correction entity and an optical fiber framing platform, the optical fiber correction entity is provided with a butterfly-shaped optical fiber pressing block, the optical fiber framing platform is provided with an optical fiber threaded column, a pair of sensing monitoring barrel and disturbance eliminating barrel arranged in parallel are arranged below the upper fixed platform, the downside of the sensing monitoring barrel is connected with a left fiber fixing beam, the left fiber fixing beam is connected with a left barrel bottom cone, the left barrel bottom cone is hinged with a left port light source protection body, the lower end of the disturbance eliminating barrel is connected with a right fiber fixing beam, the right fiber fixing beam is connected with a right barrel bottom cone, the right barrel bottom cone is hinged with a right port light source protection body, the left barrel bottom cone and the right barrel bottom cone are located on the lower fixed platforms, a left channel sensing optical fiber reaches the left port light source protection body after sequentially passing through the butterfly-shaped optical fiber pressing block, the optical fiber correction entity, the sensing monitoring barrel and the left barrel bottom cone, and a right channel sensing optical fiber reaches the right port light source protection body after sequentially passing through the optical fiber framing platform, the disturbance eliminating barrel and the right barrel bottom cone.

Preferably, a ring structure is arranged directly under the optical fiber correction entity, two sides of the ring structure are respectively provided with a left elastic body and a right elastic body, the left elastic body and the right elastic body are respectively connected with a left magnet and a right magnet, the left magnet and the right magnet are fixedly arranged on the upper fixed platform, and the left channel sensing optical fiber bypasses the ring structure and penetrates into the sensing monitoring barrel. The left magnet and the right magnet are cooperatively used to amplify the microvibration, so that various vibration information can be caught in time, the left channel sensing optical fiber is located on the ring structure between the left elastic body and the right elastic body, so that the left elastic body and the right elastic body which are located at two sides can also play a role in reducing greater vibration when the greater vibration occurs, the microvibration may be caught, and greater-amplitude vibration may also be borne.

Preferably, each of the upper fixed platform and the lower fixed platforms is provided with a substrate, and substrate fitting holes are formed in the substrates.

Preferably, the top end of the upper fixed platform is provided with an arc-shaped optical fiber plate cover, information acquisition devices are arranged in the arc-shaped optical fiber plate cover, and the arc-shaped optical fiber plate cover is capable of protecting outlet ends of the left channel sensing optical fiber and the right channel sensing optical fiber from external disturbance.

Preferably, a compact vibration damping structure is filled between the disturbance eliminating barrel and the right channel sensing optical fiber, so that external vibration disturbance suffered by the right channel sensing optical fiber can be reduced.

Preferably, the compact vibration damping structure is made of HDPE high-density polyethylene.

A method of the dynamic diagnosis system for concrete damage based on the distributed sensing optical fiber includes the following steps:

firstly, preparing a left channel sensing optical fiber with relatively high strength, regulating an angle of the left channel sensing optical fiber by a butterfly-shaped optical fiber pressing block, then, vertically or horizontally regulating the left channel sensing optical fiber by an optical fiber correction entity, then, making the left channel sensing optical fiber bypass a ring structure between a left elastic body and a right elastic body, making the left channel sensing optical fiber pass through a sensing monitoring barrel, then, fixing the tail end of the left channel sensing optical fiber at a left fiber fixing beam, and guiding the left channel sensing optical fiber to reach a left port light source protection body by a left barrel bottom cone to complete the configuration of the left channel sensing optical fiber;

secondly, preparing a right channel sensing optical fiber having the same length and parameters with the left channel sensing optical fiber, cooperatively using an optical fiber threaded column and an optical fiber framing platform to complete the parallel arrangement of the right channel sensing optical fiber and the left channel sensing optical fiber, then, making the right channel sensing optical fiber penetrate through a disturbance eliminating barrel, filling a compact structure between the right channel sensing optical fiber and the disturbance eliminating barrel, and guiding the right channel sensing optical fiber to reach a right port light source protection body by a right barrel bottom cone to complete the configuration of the right channel sensing optical fiber;

thirdly, closing the left port light source protection body and the right port light source protection body, closing an arc-shaped optical fiber plate cover, fixing the dynamic diagnosis system for concrete structural damage on a to-be-monitored structure through substrate fitting holes, starting the left port light source protection body and the right port light source protection body, acquiring optical information of the right channel sensing optical fiber and the left channel sensing optical fiber at the arc-shaped optical fiber plate cover, and carrying out correction; and fourthly, the optical information in the left channel sensing optical fiber changes when the to-be-monitored structure is damaged by external vibrating loads or other loads, at the moment, establishing a relation between an optical information difference value of the left channel sensing optical fiber and the right channel sensing optical fiber and a structural damage index, dynamically reflecting a structural damage index value based on an optical information value acquired in real time, and drawing a time history curve to realize the dynamic diagnosis of concrete structural damage.

In the present invention, sensing equipment in traditional sense is broken through, the left channel sensing optical fiber and the right channel sensing optical fiber are constructed by focusing on the development tendency of a sensing monitoring technology towards intelligentization, digitization, integration and miniaturization and fusing principles such as electromagnetics and mechanicals, not only can microvibration be caught, but also greater-amplitude vibration can be borne, so that the vibration monitoring range is greatly widened, the demand for dynamic diagnosis of concrete structural damage is met perfectly, and the important support is provided for the current dynamic health monitoring and detection of a hydraulic concrete structure.

In the present invention, the left channel sensing optical fiber and the right channel sensing optical fiber are independently and synchronously arranged into the sensing monitoring barrel and the disturbance eliminating barrel in parallel, the left channel sensing optical fiber is in a state that two ends are fixed and the middle is free, the right channel sensing optical fiber is tightly coincided with the disturbance eliminating barrel, and the compact vibration damping structure between the disturbance eliminating barrel and the right channel sensing optical fiber is capable of reducing external vibration disturbance suffered by the right channel sensing optical fiber under the action of the external vibrating load. The left fiber fixing beam is internally provided with a sensing optical fiber channel with the diameter being slightly smaller than the diameter of the left channel sensing optical fiber, and the left channel sensing optical fiber may be clamped when passing through the channel.

Beneficial effects: the dynamic diagnosis system for concrete structural damage based on the distributed sensing optical fiber, provided by the present invention, is structurally complete and capable of realizing process oriented and automatic application and has greater advantages on the aspects such as monitoring cost reduction, monitoring precision improvement and project practicability ability improvement; and according to the diagnosis method of the dynamic diagnosis system for concrete structural damage based on the distributed sensing optical fiber, provided by the present invention, a damage condition of a concrete structure is reflected in time by establishing the relation between optical information changes of the sensing optical fibers in the dynamic diagnosis system for concrete structural damage and a concrete structural damage level based on sensing optical information voluntarily formed in the left channel sensing optical fiber and the right channel sensing optical fiber, principles such as electromagnetics and mechanicals are fused, not only can the left magnet and the right magnet amplify microvibration, but also the left elastic body and the right elastic body which are located at two sides can play a role in reducing greater vibration under the condition of a dynamic load, not only can the microvibration be caught, but also the greater-amplitude vibration can be borne, so that the vibration monitoring range is greatly widened, the demand for dynamic diagnosis of actual concrete structural damage is met perfectly, and the application and popularization abilities of the technology to actual projects are greatly improved.

Wherein: 1—left channel sensing optical fiber; 2—right channel sensing optical fiber; 3—arc-shaped optical fiber plate cover; 4—butterfly-shaped optical fiber pressing block; 5—optical fiber correction entity; 6—upper fixed platform; 7—left magnet; 8—right magnet; 9—left elastic body; 10—right elastic body; 11—sensing monitoring barrel; 12—left fiber fixing beam; 13—left barrel bottom cone; 14—left port light source protection body; 15—substrate; 16—optical fiber threaded column; 17—optical fiber framing platform; 18—substrate fitting hole; 20—disturbance eliminating barrel; 21—right fiber fixing beam; 22—right barrel bottom cone; 23—right port light source protection body; 24—lower fixed platform.

DETAILED DESCRIPTION OF THE EMBODIMENTS

The present invention is further described below in combination with the accompanying drawings.

Figure 1:
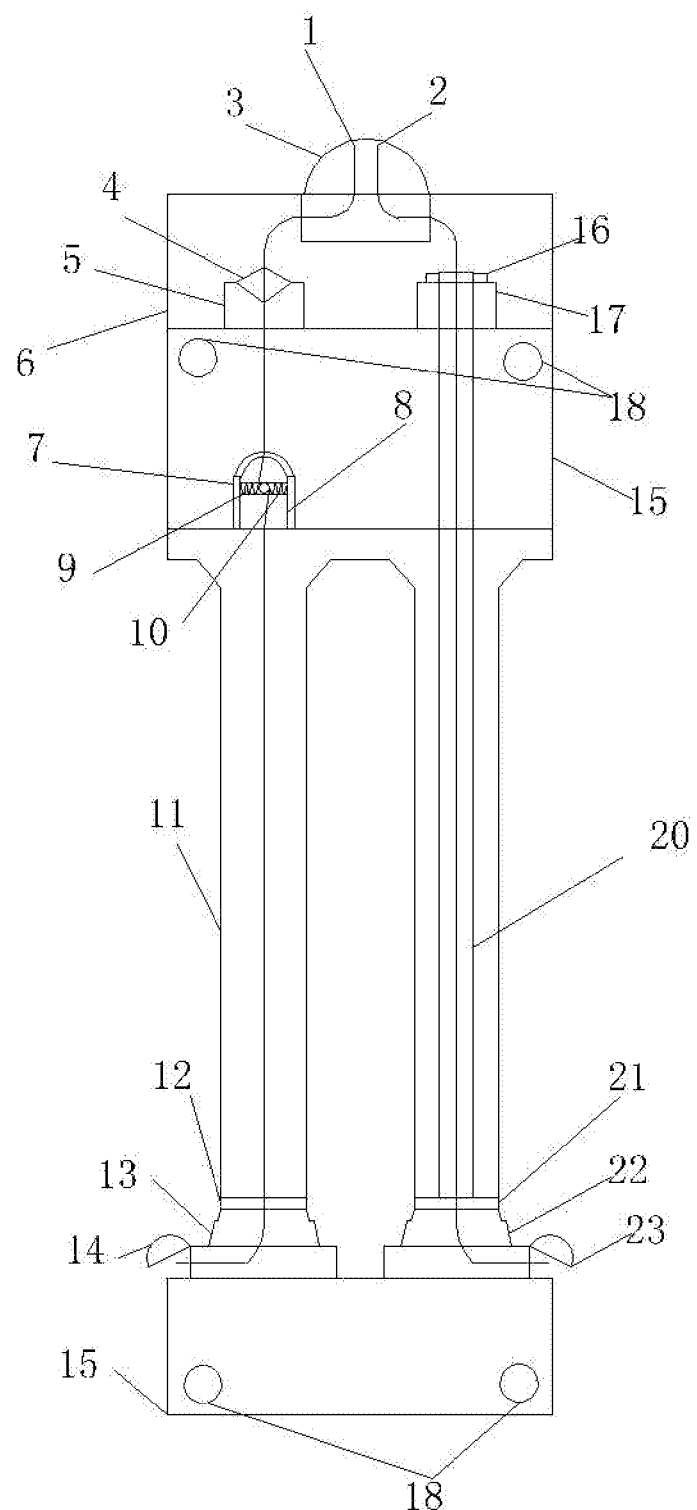
FIG. 1 is a structural diagram of the present invention.
Figure 2:
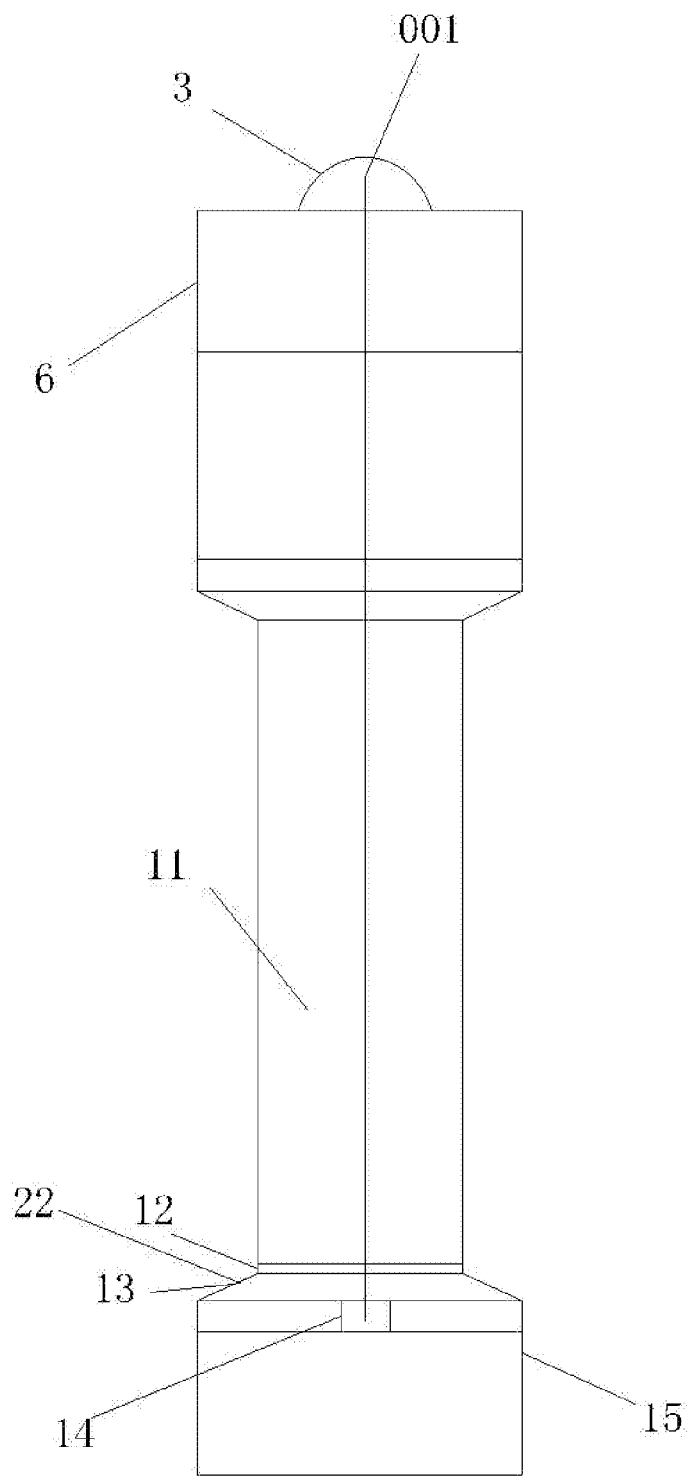
FIG. 2 is a left view of FIG. 1.
Figure 3:
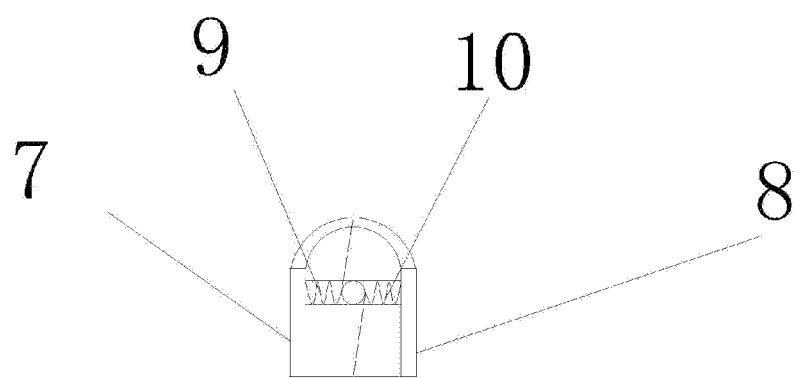
FIG. 3 is a structural schematic diagram of a left elastic body and a right elastic body in FIG. 1.

As shown in FIG. 1 to FIG. 3, a dynamic diagnosis system for concrete structural damage based on a distributed sensing optical fiber, provided by the present invention, includes a vibration sensing module, a disturbance eliminating module and an auxiliary module, the vibration sensing module is fixed on an upper fixed platform 6, an SFS50/125G type left channel sensing optical fiber 1 in the vibration sensing module is respectively connected with a butterfly-shaped optical fiber pressing block 4 and an optical fiber correction entity 5 with a square appearance, the butterfly-shaped optical fiber pressing block 4 mainly plays balancing and fixing roles, angle regulation means that the butterfly-shaped optical fiber pressing block 4 can rotate around the optical fiber correction entity to move the optical fiber correction entity 5 so that the movement of the optical fiber correction entity is realized, the SFS50/125G type left channel sensing optical fiber 1 is connected with a ring structure after penetrating out of the optical fiber correction entity 5 with the square appearance, the ring structure is respectively connected with a left elastic body 9 with the diameter of 0.5 cm and a right elastic body 10 with the diameter of 0.5 cm, the left elastic body 9 is fixed at the end of a left magnet 7 with a rectangular appearance, the right elastic body 10 is fixed at the end of a right magnet 8 with a rectangular appearance, the SFS50/125G type left channel sensing optical fiber 1 is connected with a left fiber fixing beam 12 with the diameter of 2 cm through a sensing monitoring barrel 11 with the length of 20 cm and the diameter of 2 cm, the downside of the left fiber fixing beam 12 is connected with a left barrel bottom cone 13 with a trapezoidal section, then, the SFS50/125G type left channel sensing optical fiber 1 is connected with a left port light source protection body 14 in which an HL2000 type miniature halogen light source is configured, and the left barrel bottom cone 13 is located on one of the lower fixed platforms 24.

An SFS50/125G type right channel sensing optical fiber 2 in the disturbance eliminating module is connected with a disturbance eliminating barrel 20 with the diameter of 2 cm and the length of 20 cm through an optical fiber threaded column 16 with the diameter of 2 cm and an optical fiber framing platform 17 with a square appearance, a disturbance eliminating function is mainly embodied in that two ends of the section of sensing optical fiber are tightly fixed and are not affected by external loads and the sensing optical fiber has the disturbance eliminating function as comparison with a sensing optical fiber in the sensing monitoring barrel, the bottom end of the disturbance eliminating barrel 20 is fixedly provided with a right fiber fixing beam 21 with the diameter of 2 cm, the right fiber fixing beam 21 is connected with a right barrel bottom cone 22 which is arranged to be trapezoidal, the bottom end of the SFS50/125G type right channel sensing optical fiber 2 is connected with a right port light source protection body 23 in which an HL2000 type miniature halogen light source 23 is configured, and the right barrel bottom cone 22 is located on the other lower fixed platform 24.

Substrate fitting holes 18 with the diameters of 0.5 cm are formed in a cuboid substrate 15 in the auxiliary module, the upper half part of the dynamic diagnosis system for concrete structural damage based on the distributed sensing optical fiber is fixed on a typical dam section of a certain to-be-monitored concrete gravity dam by the substrate fitting holes 18 with the diameters of 0.5 cm, substrate fitting holes 18 with the diameters of 0.5 cm are formed in the other cuboid substrate 15, and the lower half part of the dynamic diagnosis system for concrete structural damage based on the distributed sensing optical fiber is fixedly arranged on a typical dam section of a certain to-be-monitored concrete gravity dam by the substrate fitting holes 18 with the diameters of 0.5 cm.

In the present invention, the SFS50/125G type left channel sensing optical fiber 1 and the SFS50/125G type right channel sensing optical fiber 2 are independently and synchronously arranged into the sensing monitoring barrel 11 and the disturbance eliminating barrel 20 in parallel, the left fiber fixing beam 12 is interconnected with the left barrel bottom cone 13 so that the vertical or horizontal state of the SFS50/125G type left channel sensing optical fiber in an initial state in the sensing monitoring barrel is guaranteed, information acquisition devices including a C11708MA type miniature optical information acquisition device and a magnetic card data acquisition device are configured in an arc-shaped optical fiber plate cover, the left channel sensing optical fiber and the right channel sensing optical fiber are converged at the top end of one of the substrates by the arc-shaped optical fiber plate cover, and the arc-shaped optical fiber plate cover is capable of protecting the outlet ends of the left channel sensing optical fiber and the right channel sensing optical fiber from external disturbance.

A diagnosis method of the dynamic diagnosis system for concrete structural damage based on the distributed sensing optical fiber comprises the following steps:

(1) Constructing and Configuring a Vibration Sensing Module and a Disturbance Eliminating Module Regulating an angle of an SFS50/125G type left channel sensing optical fiber 1 to 30 degrees by a butterfly-shaped optical fiber pressing block 4, then, regulating the SFS50/125G type left channel sensing optical fiber 1 in a horizontal direction by an optical fiber correction entity 5, then, arranging the SFS50/125G type left channel sensing optical fiber 1 around a ring structure between a left elastic body and a right elastic body, then, making the SFS50/125G type left channel sensing optical fiber 1 penetrate through a sensing monitoring barrel, fixing the tail end of the left channel sensing optical fiber at a left fiber fixing beam with the diameter of 2 cm, then, connecting the SFS50/125G type left channel sensing optical fiber 1 with a left port light source protection body 14 in which an HL2000 type miniature halogen light source is configured, then, preparing an SFS50/125G type right channel sensing optical fiber with the length of 50 cm, continuously regulating an optical fiber threaded column 16 and an optical fiber framing platform 17 to keep the right channel sensing optical fiber 2 parallel to the left channel sensing optical fiber 1, then, making the right channel sensing optical fiber 2 penetrate through a disturbance eliminating barrel 20, a right barrel bottom cone 22 and a right port light source protection body 23 sequentially, filling HDPE high-density polyethylene between the right channel sensing optical fiber 2 and the disturbance eliminating barrel 20, and guiding the right channel sensing optical fiber 2 to reach the right port light source protection body 23.

(2) Closing Each Part and Checking the Connectivity of Each Circuit

Closing the left port light source protection body 14 and the right port light source protection body 23, closing an arc-shaped optical fiber plate cover 3, starting the HL2000 type miniature halogen light sources in the left port light source protection body 14 and the right port light source protection body 23, acquiring optical information of the right channel sensing optical fiber 2 and the left channel sensing optical fiber 1 at the arc-shaped optical fiber plate cover, checking the connectivity of the SFS50/125G type left channel sensing optical fiber 1 and the SFS50/125G type right channel sensing optical fiber 2, and computationally carrying out optical information of the right channel sensing optical fiber 2 and the left channel sensing optical fiber 1.

(3) Mounting the Dynamic Diagnosis System for Concrete Structural Damage and Carrying Out Initial Detection Determining a monitored region of a typical dam section of a to-be-monitored concrete gravity dam, then, determining the usage number of the produced dynamic diagnosis devices, effectively mounting the dynamic diagnosis system for concrete structural damage by using a fixing device through substrate fitting holes 18 in a substrate 15 and substrate fitting holes 18 in the other substrate 15 after determining the monitored region, and starting a C11708MA type miniature optical information acquisition device and a magnetic card data acquisition device in the arc-shaped optical fiber plate cover 3 as well as the HL2000 type miniature halogen light sources in the left port light source protection body 14 and the right port light source protection body 23 to complete the detection of an initial value.

(4) Establishing a Relation Between an Optical Power Value Difference and a Structural Damage Index to Realize Dynamic Detection An optical power value in the left channel sensing optical fiber 1 changes when the monitored region of the typical dam section of the to-be-monitored concrete gravity dam suffers from other vibration loads or damage such as external water load or earthquake, then, constructing a relation between an optical power value difference of the left channel sensing optical fiber 1 and the right channel sensing optical fiber 2 and a structural damage index, then, drawing a time history curve of an optical info nation value acquired in real time and a structural damage index value to complete the real-time diagnosis of structural damage of the monitored region of the typical dam section of the concrete gravity dam.

The above description is merely used as preferred embodiments of the present invention, it should be noted that several improvements and modifications can also be made by the ordinary skilled in the art without departing from the principle of the present invention, and the improvements and modifications should be regarded to fall into the protection scope of the present invention.

What is claimed is:

1. A dynamic diagnosis system for concrete damage based on a distributed sensing optical fiber, comprising an upper fixed platform and lower fixed platforms, the upper fixed platform being internally provided with an optical fiber correction entity and an optical fiber framing platform, the optical fiber correction entity being provided with a butterfly-shaped optical fiber pressing block, the optical fiber framing platform being provided with an optical fiber threaded column, a sensing monitoring barrel and a disturbance eliminating barrel made up a pair and arranged in parallel being arranged below the upper fixed platform, the downside of the sensing monitoring barrel being connected with a left fiber fixing beam, the left fiber fixing beam being connected with a left barrel bottom cone, the left barrel bottom cone being hinged with a left port light source protection body, the lower end of the disturbance eliminating barrel being connected with a right fiber fixing beam, the right fiber fixing beam being connected with a right barrel bottom cone, the right barrel bottom cone being hinged with a right port light source protection body, the left barrel bottom cone and the right barrel bottom cone being located on the lower fixed platforms, a left channel sensing optical fiber reaching the left port light source protection body after sequentially passing through the butterfly-shaped optical fiber pressing block, the optical fiber correction entity, the sensing monitoring barrel and the left barrel bottom cone, and a right channel sensing optical fiber reaching the right port light source protection body after sequentially passing through the optical fiber framing platform, the disturbance eliminating barrel and the right barrel bottom cone;

wherein a ring structure is arranged directly under the optical fiber correction entity, two sides of the ring structure are respectively provided with a left elastic body and a right elastic body, the left elastic body and the right elastic body are respectively connected with a left magnet and a right magnet, the left magnet and the right magnet are fixedly arranged on the upper fixed platform, the left channel sensing optical fiber connects with the ring structure, and the left channel sensing optical fiber penetrates into the sensing monitoring barrel.

2. The dynamic diagnosis system for concrete damage based on the distributed sensing optical fiber of claim 1, wherein each of the upper fixed platform and the lower fixed platforms is provided with a substrate, and substrate fitting holes are formed in the substrates.

3. The dynamic diagnosis system for concrete damage based on the distributed sensing optical fiber of claim 2, wherein the top end of the upper fixed platform is provided with an arc-shaped optical fiber plate cover, and information acquisition devices are arranged in the arc-shaped optical fiber plate cover.

4. The dynamic diagnosis system for concrete damage based on the distributed sensing optical fiber of claim 1, wherein a compact vibration damping structure is filled between the disturbance eliminating barrel and the right channel sensing optical fiber.

5. The dynamic diagnosis system for concrete damage based on the distributed sensing optical fiber of claim 4, wherein the compact vibration damping structure is made of HDPE high-density polyethylene.

6. A method of the dynamic diagnosis system for concrete damage based on the distributed sensing optical fiber of claim 4, comprising the following steps:

firstly, connecting the left channel sensing optical fiber which has relatively high strength compared with the right channel sensing optical fiber to be affected by external loads with the butterfly-shaped optical fiber pressing block and the optical fiber correction entity, regulating an angle of the left channel sensing optical fiber by the butterfly-shaped optical fiber pressing block, then, vertically or horizontally regulating the left channel sensing optical fiber by the optical fiber correction entity, then, making the left channel sensing optical fiber bypass the ring structure between the left elastic body and the right elastic body, making the left channel sensing optical fiber pass through the sensing monitoring barrel, then, fixing a tail end of the left channel sensing optical fiber at the left fiber fixing beam, and guiding the left channel sensing optical fiber to reach the left port light source protection body by the left barrel bottom cone to complete the configuration of the left channel sensing optical fiber;

secondly, connecting the right channel sensing optical fiber having same length and parameters as the left channel sensing optical fiber to compare with the left channel sensing optical fiber with the disturbance eliminating barrel, cooperatively using the optical fiber threaded column and the optical fiber framing platform to complete the parallel arrangement of the right channel sensing optical fiber and the left channel sensing optical fiber, then, making the right channel sensing optical fiber penetrate through the disturbance eliminating barrel, filling the compact vibration structure between the right channel sensing optical fiber and the disturbance eliminating barrel, and guiding the right channel sensing optical fiber to reach the right port light source protection body by the right barrel bottom cone to complete the configuration of the right channel sensing optical fiber;

thirdly, closing the left port light source protection body and the right port light source protection body, closing the arc-shaped optical fiber plate cover, fixing the dynamic diagnosis system for concrete structural damage on a to-be-monitored structure through substrate fitting holes, starting the left port light source protection body and the right port light source protection body, acquiring optical information of the right channel sensing optical fiber and the left channel sensing optical fiber at the arc-shaped optical fiber plate cover to computationally carry out optical information of the right channel sensing optical fiber and the left channel sensing optical fiber; and fourthly, the optical information in the left channel sensing optical fiber changes when the to-be-monitored structure is damaged by external vibrating loads or other loads, at that moment, by establishing a relation between an optical information difference value of the left channel sensing optical fiber and the right channel sensing optical fiber and a structural damage index, dynamically reflecting a structural damage index value based on an optical information value acquired in real time, and drawing a time history curve to realize the dynamic diagnosis of concrete structural damage.

\* \* \* \* \*